(12) United States Patent
Marchese

(10) Patent No.: US 9,867,382 B2
(45) Date of Patent: Jan. 16, 2018

(54) ELASTIC POULTRY BINDER CONSTRUCTION

(71) Applicant: Gerald J. Marchese, Wayne, IL (US)

(72) Inventor: Gerald J. Marchese, Wayne, IL (US)

( * ) Notice: Subject to any disclaimer, the term of this patent is extended or adjusted under 35 U.S.C. 154(b) by 1172 days.

(21) Appl. No.: 13/804,033

(22) Filed: Mar. 14, 2013

(65) Prior Publication Data

US 2014/0261011 A1 Sep. 18, 2014

(51) Int. Cl.
*A47J 37/12* (2006.01)
*A22C 21/00* (2006.01)

(52) U.S. Cl.
CPC .................. *A22C 21/0038* (2013.01)

(58) Field of Classification Search
CPC .............. A22C 21/0038; A47J 43/18
USPC .......... 99/353; 452/174, 176, 169, 198, 132; 426/94, 95, 99, 101, 103, 108, 138–139, 426/143, 144, 279, 282, 283, 391, 514, 426/549
See application file for complete search history.

(56) References Cited

U.S. PATENT DOCUMENTS

| 2,842,443 | A | * | 7/1958 | Rice | A22C 21/0038 426/132 |
| 3,226,796 | A | * | 1/1966 | Fox | D03D 15/08 139/423 |
| 3,690,811 | A | * | 9/1972 | Horning | D06P 3/54 57/255 |
| 5,181,880 | A | * | 1/1993 | Volk | A22C 21/0038 452/174 |
| 5,816,905 | A | * | 10/1998 | Marchese | A22C 21/0038 452/174 |

* cited by examiner

*Primary Examiner* — Phuong Nguyen
(74) *Attorney, Agent, or Firm* — Banner & Witcoff, Ltd.

(57) ABSTRACT

A vulcanized latex loop or loops, wrapped by multiple spirally wound, generally non-elastic ribbons may be stretched over the legs and tail of a dressed bird to close the cavity of the bird during cooking. The loop or loops may be stretched to bind a bird in various ways depending upon the size and configuration of the bird.

6 Claims, 5 Drawing Sheets

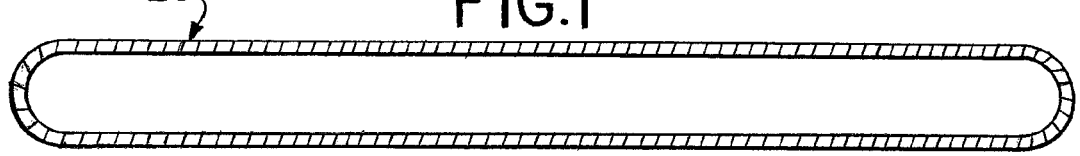
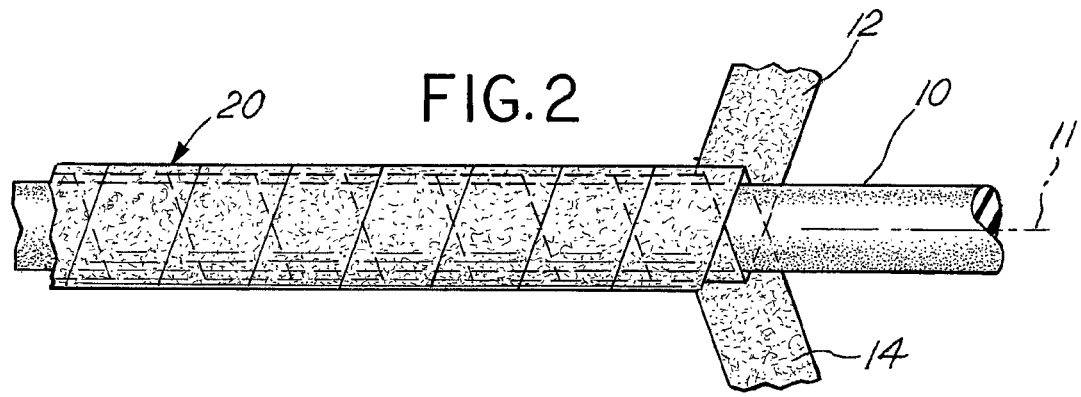

ELASTIC POULTRY BINDER CONSTRUCTION

BACKGROUND OF THE INVENTION

Trussing of poultry such as turkeys, chickens, ducks and the like is often accomplished by a plastic or metal trussing device which engages the leg area or hocks of the bird and holds the legs tightly hound to the body and tail of the bird in an effort to close and maintain closed the entry to a cavity within the bird. Such metal devices are often galvanized and due to the processing of the bird, the galvanized metal may deteriorate or flake. Such metal or plastic trusses must also be removed from a dressed bird in order to remove the giblets from the cavity of the bird, then replaced after stuffing the bird for final cooking preparation. This is often a difficult and tedious chore. Additionally, because during the cooking process, the plastic or metal trussing device and the bird are heated to a relatively high temperature. The trussing device will be hot and thus difficult to remove to proceed with removing the stuffing and carving. Thus, there has developed a need for an improved simpler and easy to use trussing device for variously sized birds, poultry or fowl.

SUMMARY OF THE INVENTION

Briefly, the present invention comprises a trussing device for fowl or birds which is in the form of an elastic band of food grade vulcanized latex wrapped typically, for example, by layers of a textured polyester yarns or other woven fabric material. The wrapping includes at least two layers of a fabric in the form of a ribbon. Each layer of ribbon is spirally wrapped around the elastic band. The ribbons, which are spirally wrapped around one or more latex elastic bands, maintain and coverage of the band or bands as they are stretched to thereby prevent exposure of the band or bands and contact with the surface of a bird, as well as the heat of an oven.

In use, the trussing device is initially placed over the spaced legs of the bird or fowl and then manually gripped on one side and pulled or stretched over the tail of the bird or fowl. In this manner the legs are elastically bound and held in a fixed position with respect to the tail to thereby close the cavity to the interior of the bird. Multiple devices of the type described may be used in combination. The construction of the device may provide a partially auxetic binding material which, in combination with the elasticity of the vulcanized latex band insures that the elastic trussing device will remain appropriately engaged over the legs and the tail of the bird with the cavity closed. The trussing device is easily applied and easily removed.

Thus, it is an object of the invention to provide an improved bird or fowl trussing device.

It is a further object of the invention to provide a method for trussing fowl and poultry which is easy to practice and simple to learn.

Another object of the invention is to provide an elastic, closed loop band of vulcanized latex material in combination with wrappings or ribbons spirally encircling and engaging the elastic material to thereby insure a trussing device which is resilient, yet which is capable of holding a trussed bird securely in a desired position during a cooking operation.

Another object of the invention is to provide a trussing device which is easier to use, which may be utilized for initial dressing by a commercial preparer, subsequently removed and then easily replaced and be further re-used by the consumer, which does not degrade during use and which is not subject to deterioration during heating or throughout the entire cooking process.

A further object and feature of the invention is to provide a trussing device which may be manually removed and then repositioned prior to cooking. Thereby providing an added value and convenience to the consumer.

Yet a further object, advantage and feature of the invention is a trussing device which may be easily removed from fowl or poultry after cooking without exposing the cook to a hot trussing device made from a metal wire or plastic.

These and other objects, advantages and features of the invention will be set forth in a detailed description of embodiments of the invention which follows.

BRIEF DESCRIPTION OF THE DRAWING

In the detailed description which follows, reference will be made to the drawing comprised of the following figures:

FIG. 1 is a plan view of the trussing device;

FIG. 2 is an sectioned partial plan view of a position of the trussing device illustrating the component parts of the device;

FIG. 2 is a side view of the trussing device position about the legs of poultry;

DESCRIPTION OF EMBODIMENTS OF THE INVENTION

Figure 3:
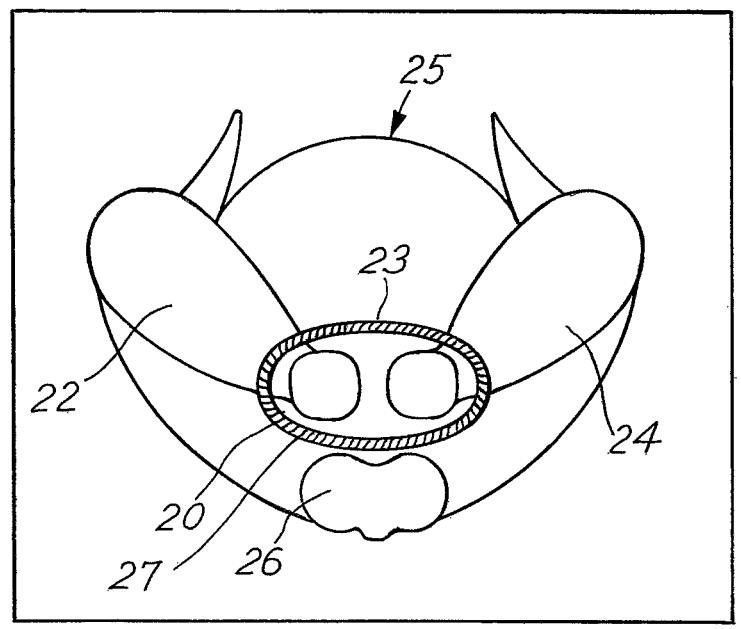
FIG. 3 is a pictorial view of the trussing device or binder construction positioned on the hocks or legs of poultry.

FIGS. 1 and 2 illustrate an example of a binding construction or trussing device made in accord with the invention. A closed loop 10 of vulcanized latex material has a diameter thickness in the range of about 0.5 to 3.5 millimeters, a length in the range of about 3.5 to about 7 inches and a coefficient of elasticity which enables stretching from an unstretched state to an elongate state without breaking in the range of about 150-200%.

An important feature of the invention is the use of ribbons of material wrapped about the vulcanized latex loop 10. Each ribbon defines at least a partial cover of the band or loop 10 and each has a longitudinal axis. Thus, a first ribbon 12 may be wrapped in a spiral counterclockwise direction about the material comprising the loop 10. A second ribbon 14 may be wrapped in a spiral clockwise direction. The directions may be altered. That is, the first ribbon 12 may be wrapped in a clockwise direction and the second ribbon 14 may be wrapped in a counterclockwise direction.

The ribbons, in an embodiment of the invention, are a textured polyester woven fabric material having a uniform width dimension in the range of about 0.25-4 millimeters (such as a 300/2, 600/1, 450/2 denier or the like). The ribbons 12 and 14 are generally tightly wrapped in a spiral pattern of about the axis 11 of the vulcanized latex loop 10. The tight wrapping may provide an auxetic structure or partially auxetic structure which when stretched, will tend to swell or increase in a lateral dimension or cross section. This is the reverse of most situations wherein elastic materials, due to Hookes law, become effectively thinner as stretched. The polyester yarn or other fabric covering or ribbon thus may interact, at least to some extent, with the vulcanized latex material loop 10 to effect attachment thereto resulting in the swelling of the loop 10 upon stretching.

The ribbons 12, 14 are essentially inelastic relative to the vulcanized latex loop 10. As a consequence, as the diameter of the loop 10 expands or contracts and because multiple layers ribbon (at least two) are spirally wound and overlap each other, the loop 10 is not exposed as a result of stretching. Loop 10 is thus protected particularly to the extent the device does not exhibit auxetic characteristics. Balancing the elasticity of the component parts and insuring that the overlapping ribbons 12, 14 will cover loop 20 or loops 20 when stretched thus become important factors in the design of the trussing device. In this regard, if the potential attachment of the loop to a ribbon (for example ribbon 12) should result in an auxetic structure is a factor to be considered when choosing the ribbon material and latex band material as well as its width and degree of overlap of the spiral wrap of each ribbon 12, 14 with itself, with each other and with additional ribbons.

Typically, to insure that the latex loop or bands will remain covered by a protective layer of ribbons, each spirally wound layer of ribbon will overlap in the range of about 50% or more of the width of the ribbon. Thus, if the stretch bands are elongated 200% (two times their original or at rest length), each layer or ribbon will potentially be capable of expand covered to the same extent. Thereby each ribbon in the composite construction or wrapping will provide a fully protective cover. By constructing the device with two or more ribbons which are spirally wound in a counter rotational sense from layer to layer of ribbon, complete coverage of the elastic band is maintained when stretch to its design limit. Various modification and versions of this construction strategy may be adopted to insure protective coverage of the elastic band(s) including the use or more than two ribbons or ribbons of different widths for each ribbon layer for example.

In use, a binder or trussing device 20 or multiple such devices 20 may be fitted over the hocks or legs 22 and 24 of a bird 25, such as a chicken or a turkey or other fowl. This is depicted in FIG. 3. The loop 20 may then be grabbed along the top side 23 thereof (as shown in FIG. 3) and fitted or pulled over the lower or bottom side 27 of the loop a tail 26 of the bird or fowl. This action stretches the loop 20 to elastically maintain the legs or hocks 22, 24 aligned appropriately with the tail 26 and also closes cavity 28 to the interior of the bird.

FIGS. 5 through 8 illustrate an alternative way of positioning and grabbing the lower side 27 of loop 20 and manipulating it in a manner which attaches and holds the legs or hocks 22, 24 in relation to the tail 26 to close cavity 28. Thus, lower side 27 of the loop 20 may be stretched over opposite or top or upper side 23 of the loop 20. Then the stretched loop 20 is fitted over the tail 26 with legs 22, 24 folded as shown in phantom in FIG. 7. Either side 23 or side 27 the loop 20 may also be fitted over the opposite side 27, side 23 multiple times depending upon the size of the loop 20 and the bird. Thus the elastic loop 20 or multiple loops 20 enables use for a variety of sizes of birds.

Both methods can be described by referencing the legs of the bird as two corners of a triangle and the tail as the apex or third corner of a generally isosceles triangle. The loop is fitted over the points defined by the legs and then stretched over the tail as described.

Figure 4:
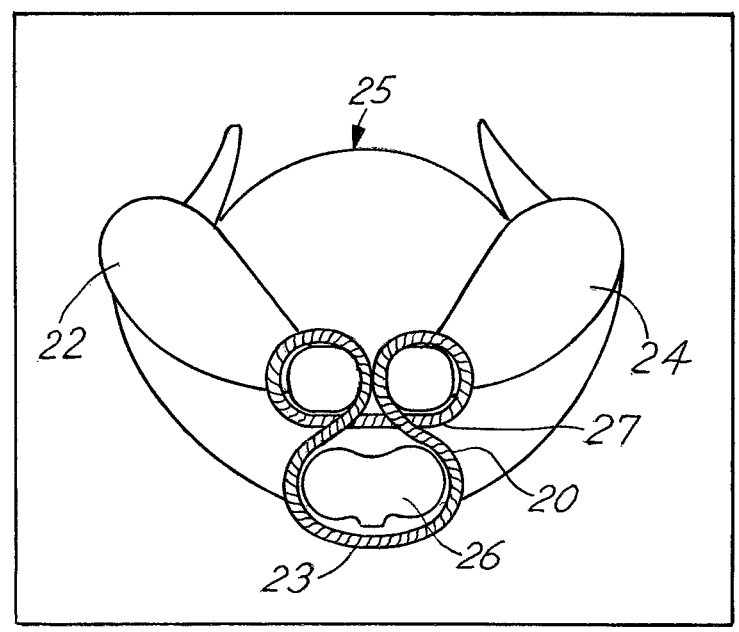
FIG. 4 depicts placement of the trussing device depicted in FIG. 3 wherein the looped elastic hand is fitted over the tail of the fowl or bird to secure closure to the cavity of the bird.
Figure 5:
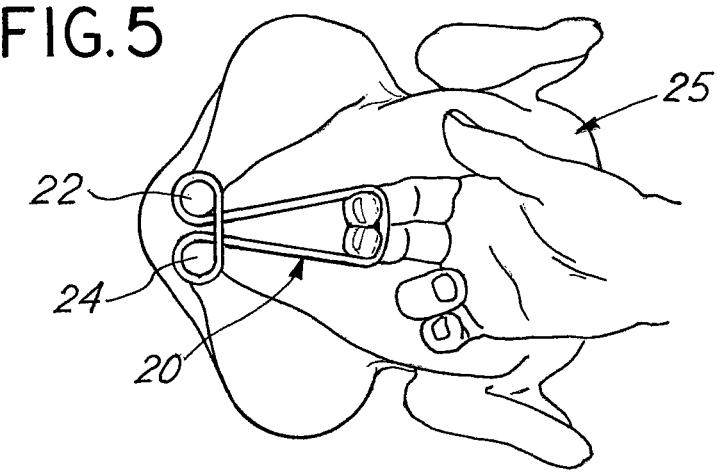
FIGS. 5, 6, 7 and 8 are pictorial views illustrating an optional method of manipulating the trussing device to bind the hocks and tail of a bird.
Figure 6:
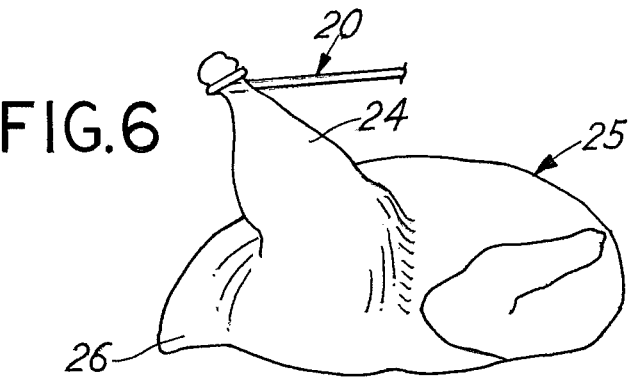
Figure 7:
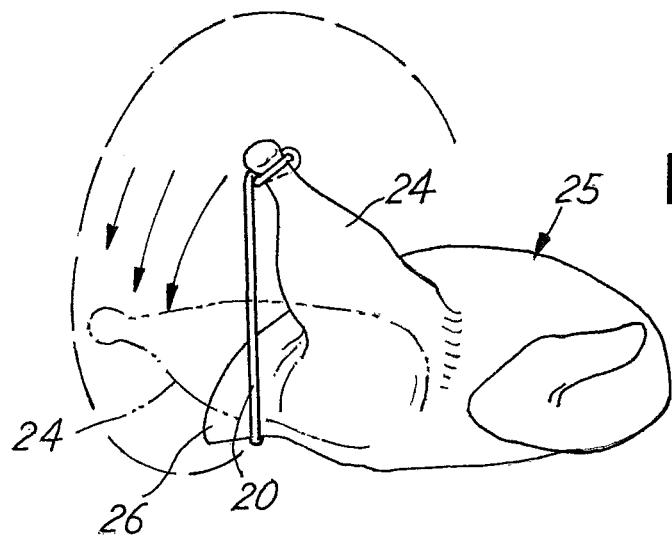
Figure 8:
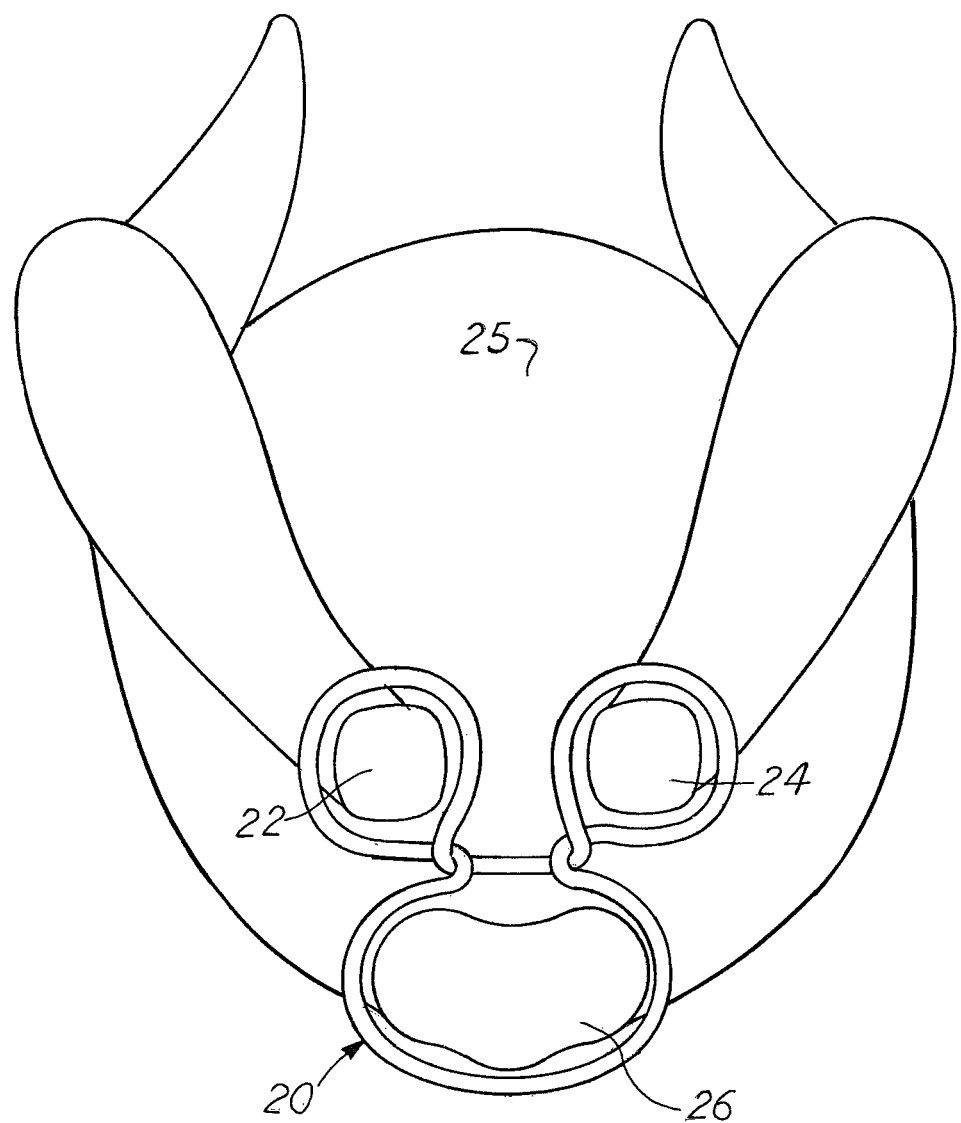
Figure 9:
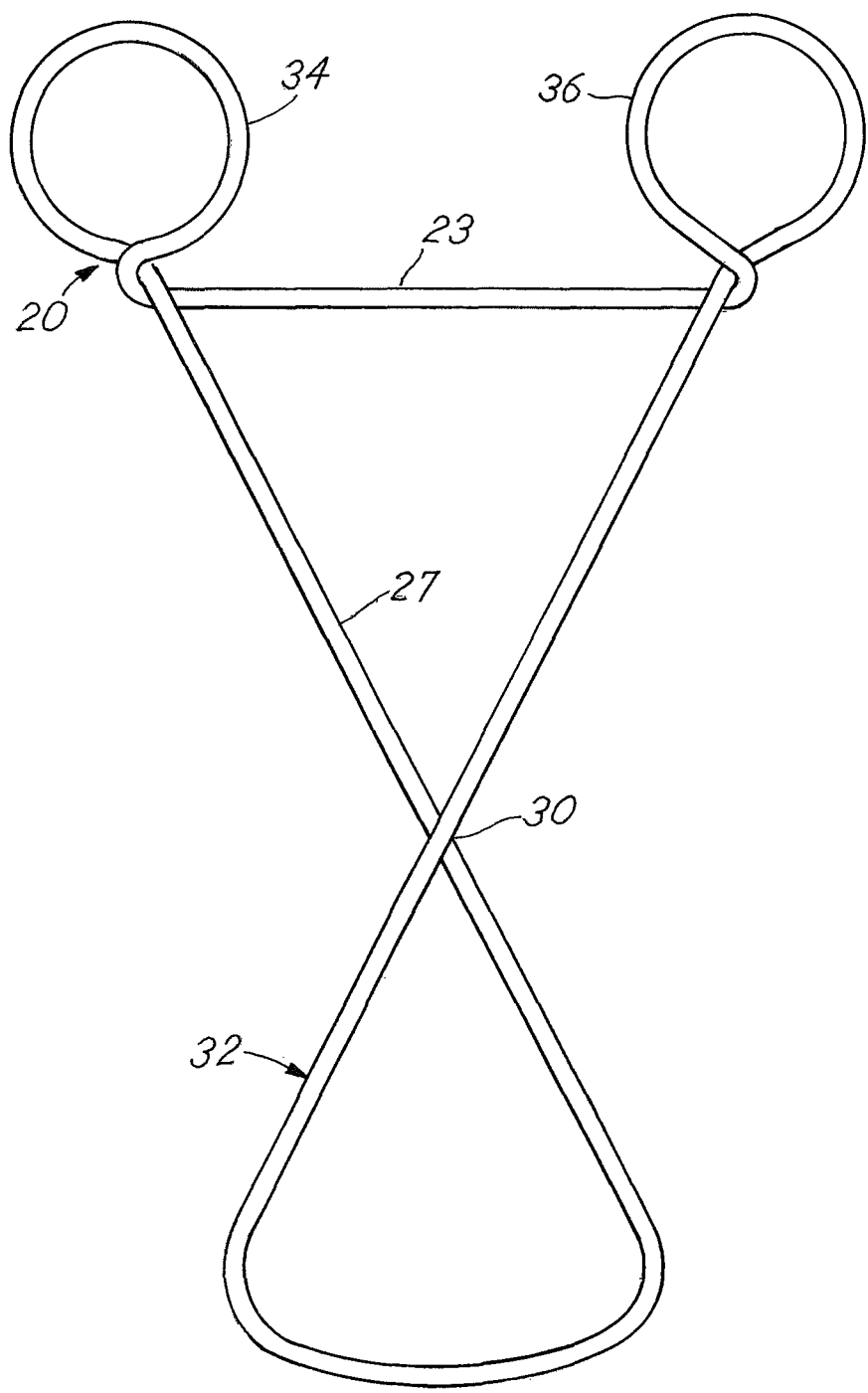
FIG. 9 is an illustration of another alternative method of using the trussing device to bind the hocks and tail of a bird.

FIG. 9 depicts a further aspect of the invention. That is, one or more loops 20 may be arranged by folding the lower side 27 of the loop over the upper side 23. The lower side 27 may then be twisted one or more times as depicted by the inner section or twist 30 to thereby create an overlapped loop section 32 which can be fitted over the tail of the bird. This enables the maintenance of the hocks encircled by loop sections 34 and 36 to be tightly repented against the body of a bird and enhances the ability to apply the loop section 32 about the tail in a manner which precludes slippage. Of course, the twisting of the loop section which is fitted over the tail may also be utilized when the loop 20 is folded as depicted in FIG. 4. In other words, after the upper side 23 of the loop is fitted around the hocks 22 and 24, the upper side may be twisted in the fashion depicted in FIG. 9 and fitted over the tail 26 of the bird 25. Consequently, with the loop construction of the present invention, it is possible to use multiple schemes for affixing the loop to the bird. Depending upon the size of the bird and its configuration, a particular scheme may be more suitable. This is a further aspect and feature of the invention; namely, that multiple schemes or protocols of attachment of the loop may be easily incorporated in the binding operation.

For example, there are disclosed at least four distinct ways of utilizing the loop in a binding operation. One or more of these distinct ways may be utilized on a single bird to thereby insure that the bird will be tightly bound for further processing.

Various other combinations of elastic material and ribbons may be utilized to provide a trussing device. For example, cord combined with ribbons may be utilized. In this regard, it is noted that the elasticity of the ribbons or cord typically is less than that of the stretchable band 20 resulting in an auxetic character of the trussing device which provides gripping with a potential increased diameter of the stretched band of the trussing device. The ribbons 10, 12 may incorporate one or more latex loops 10 to comprise a trussing device. Multiple trussing devices 20 constructed in accord with the invention may be combined to truss a single bird. The ribbons 10, 12 or equivalent may effectively fastened to or adhere to only a part of or the elastic loop 10. Thereby a trussing device may behave partly in accord with Hookes law and partly as an auxetic material. Thus the design of the loop 20 is impacted by the choice of materials for loop 1- and ribbons 12, 14.

The ribbons 12, 14 overlap each other and due to the spiral wrap and spiral counter wrap provide a protective cover layer for the loop 10 when the loop 10 stretches. As such the material forming the loop remains covered even when stretched since the ribbons 12, 14 and, in particular, the inner layer of ribbon 12 will fit over and cover loop 10 or multiple loops. This important feature precludes the heated latex material from being exposed to the surface of the bird during processing and cooking.

Various benefits result from the device and method of the invention for example: When a consumer wishes to open the cavity of a bird to remove the giblets or to stuff the bird, the loop is simply undone and saved for continued use. After removal of the giblets or when stuffing is complete, the tying process is repeated by the consumer thereby eliminating the need to use any other or further type of trussing device. The trussing device safely remains on the bird throughout the cooking process keeping the cavity closed. After cooking, the loop is simply cut or otherwise removed from the bird by the consumer. Hot wires or cumbersome plastic devices are not required.

Thus, while there has been set forth an embodiment of the invention, it is to be understood that the invention is limited only by the following claims and equivalents thereof.

What is claimed is:

1. An elastic poultry trussing device comprising:
   an elastic closed loop band of vulcanized latex having a range of elastic longation extension of about 150-200% relative to an unstretched state, a diameter in the range of 0.5 to 3.5 millimeters and a longitudinal length in the range of about 3.5 to 7 inches; and
   a first and a second polyester material woven fabric ribbon cover, said covers each having a longitudinal dimension and a lateral dimension, each said covers auxetic when stretched or partially stretched in the longitudinal dimension swell in the lateral dimension, said first cover comprising a woven polyester fabric material applied by tightly wrapping on said loop band in a first spiral wrapping sense selected from a counterclockwise wrap and a clockwise wrap covering said loop band, said second cover comprising a woven polyester fabric material applied tightly wrapped over and covering said first cover and said loop band in an opposite spiral wrapping sense of said first cover, said covers in combination providing complete coverage of the longitudinal length of said latex loop band at least within the elastic range of said latex loop band, said first cover interacting with the latex loop band and said wrapped second polyester cover to effect attachment of the first cover to said latex loop band and thereby effect lateral swelling of said latex loop upon longitudinal stretching of said loop device and positioning of said second cover over said first cover.

2. The trussing device of claim 1 wherein said trussing device loop band comprises in the range of 2 to 4 elastic closed loop bands, each said loop band having substantially the same length.

3. The poultry trussing device of claim 2 wherein said ribbon covers have an equal, uniform width in the range of 0.25 to 4 millimeters.

4. The poultry trussing device of claim 1 in combination with a bird having two spaced hocks and a tail spaced therefrom with a cavity internal to said bird intermediate the tail and hocks, said hocks and tail forming a triangular point pattern, said hocks defining first and second corners of said pattern and said tail defining a third corner apex of a generally isosceles triangle, said band looped entirely over said first and second corners defined by said hocks and extending around said hocks in opposed side by side convergence with a top run and a bottom run, said top run fitted over said tail corner to support said tail by said hocks and close, at least in part, said cavity.

5. The poultry trussing device of claim 4 wherein said top run is twisted intermediate said hocks and said tail thereby forming an open passage to fit over said tail.

6. An elastic poultry trussing device comprising:
   an elastic closed loop band of vulcanized latex material having a range of elasticity of about 150-200%, a diameter in the range of 0.5 to 3.5 millimeters and a length in the range of about 3.5 to 7 inches, said loop band having first and second textured polyester material woven ribbons wrapped in a spiral path to provide a cover for said loop band over said unstretched loop band said first one of said ribbons attached to said loop band, said first ribbon comprising a cover material applied in a first spiral wrapping sense on said loop band selected from a counterclockwise wrap and a clockwise wrap, said second ribbon comprising a cover material applied over said first ribbon and said loop band in an opposite wrapping sense in combination with the unstretched and stretched loop band, said ribbons each having an equal uniform width in the range of 0.25 to 4.0 millimeters, each being substantially inelastic in a longitudinal direction and auxetic in a lateral direction, said ribbons in combination with said loop band providing complete coverage of said loop band at least within the range of elasticity of said loop band.

* * * * *